United States Patent
Lee

(10) Patent No.: US 11,041,531 B2
(45) Date of Patent: Jun. 22, 2021

(54) SELF-CONTAINED SWITCHABLE WEDGE CLUTCH WITH TORQUE LIMITING

(71) Applicant: Schaeffler Technologies AG & Co. KG, Herzogenaurach (DE)

(72) Inventor: Brian Lee, York, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 543 days.

(21) Appl. No.: 16/036,995

(22) Filed: Jul. 17, 2018

(65) Prior Publication Data

US 2020/0025259 A1 Jan. 23, 2020

(51) Int. Cl.
*F16D 43/21* (2006.01)
*F16D 7/02* (2006.01)
*F16D 15/00* (2006.01)

(52) U.S. Cl.
CPC ............. *F16D 7/021* (2013.01); *F16D 15/00* (2013.01); *F16D 43/211* (2013.01)

(58) Field of Classification Search
CPC ........ F16D 7/021; F16D 43/21; F16D 43/211; F16D 15/00
See application file for complete search history.

(56) References Cited

U.S. PATENT DOCUMENTS

| | | | | |
|---|---|---|---|---|
| 3,539,043 A | * | 11/1970 | Brochetti | F16D 43/21 192/56.55 |
| 2008/0015034 A1 | | 1/2008 | Downey | |
| 2014/0262667 A1 | | 9/2014 | Strong | |
| 2015/0014113 A1 | * | 1/2015 | Ohr | F16D 13/14 192/70.23 |
| 2016/0091029 A1 | * | 3/2016 | Jansen | F03D 15/00 464/45 |
| 2016/0138662 A1 | | 5/2016 | He | |
| 2018/0180105 A1 | | 6/2018 | Lee et al. | |
| 2019/0085914 A1 | * | 3/2019 | Hixenbaugh | F16D 15/00 |

FOREIGN PATENT DOCUMENTS

JP  2017-516961 A  6/2017

* cited by examiner

*Primary Examiner* — Huan Le

(57) ABSTRACT

A self-contained switchable torque limited wedge clutch, consisting of a housing, a space enclosed by the housing, and a clutch assembly including: an input part with a first frusto-conical surface; an outer race in the space and including a second frusto-conical surface in contact with the first frusto-conical surface; an output hub in the space; circumferentially aligned wedge plate segments in the space; and an activation assembly arranged to displace the wedge plate segments to switch the clutch between: a locked mode and an unlocked mode. In the locked mode: for a first magnitude of the rotational torque, the first frusto-conical surface and the second frusto-conical surface are non-rotatably connected; and for a second magnitude of the rotational torque, greater than the first magnitude, the first frusto-conical surface rotates with respect to the second frusto-conical surface to switch the self-contained torque-limiting switchable wedge plate clutch to the unlocked mode.

20 Claims, 12 Drawing Sheets

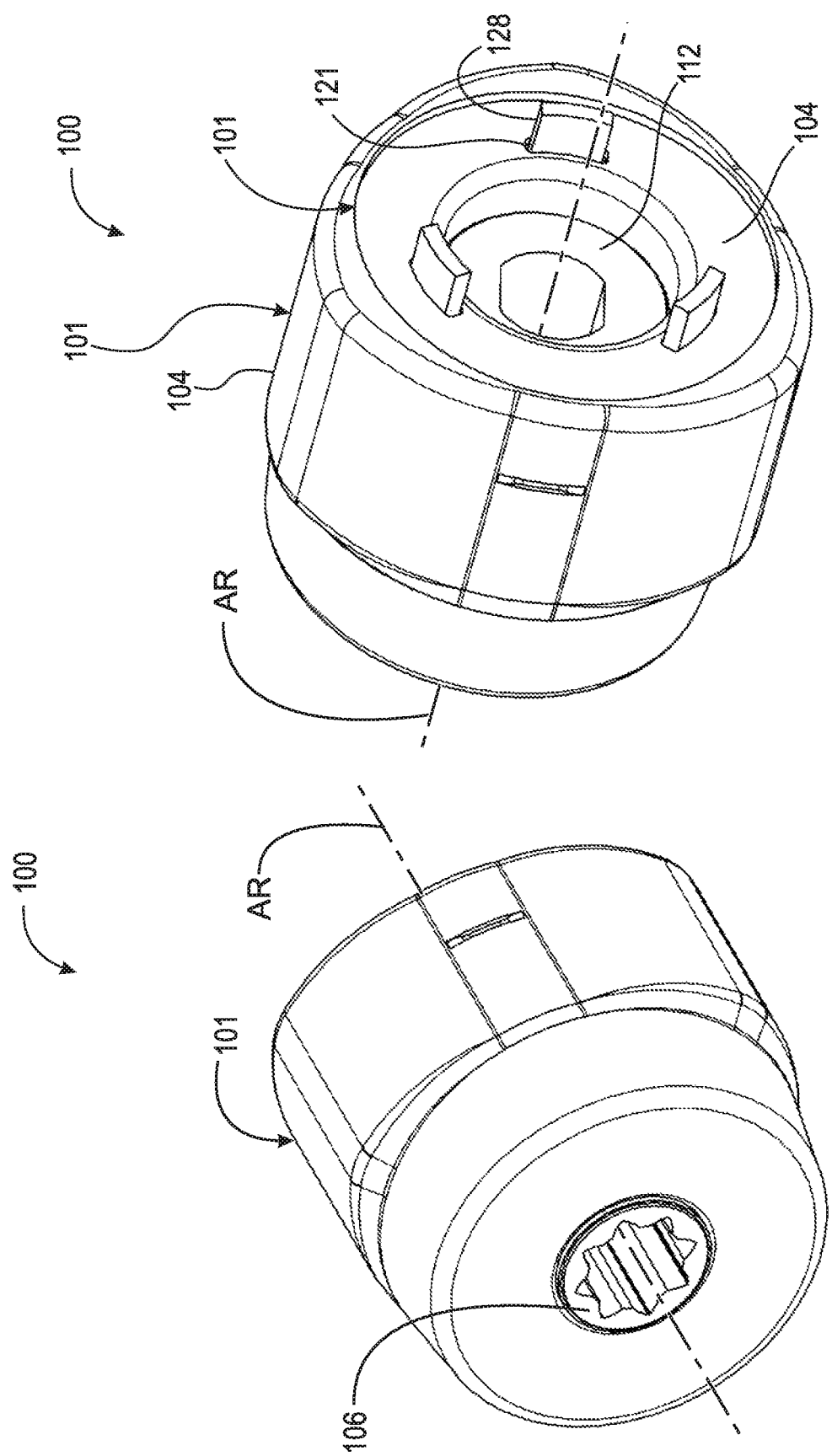

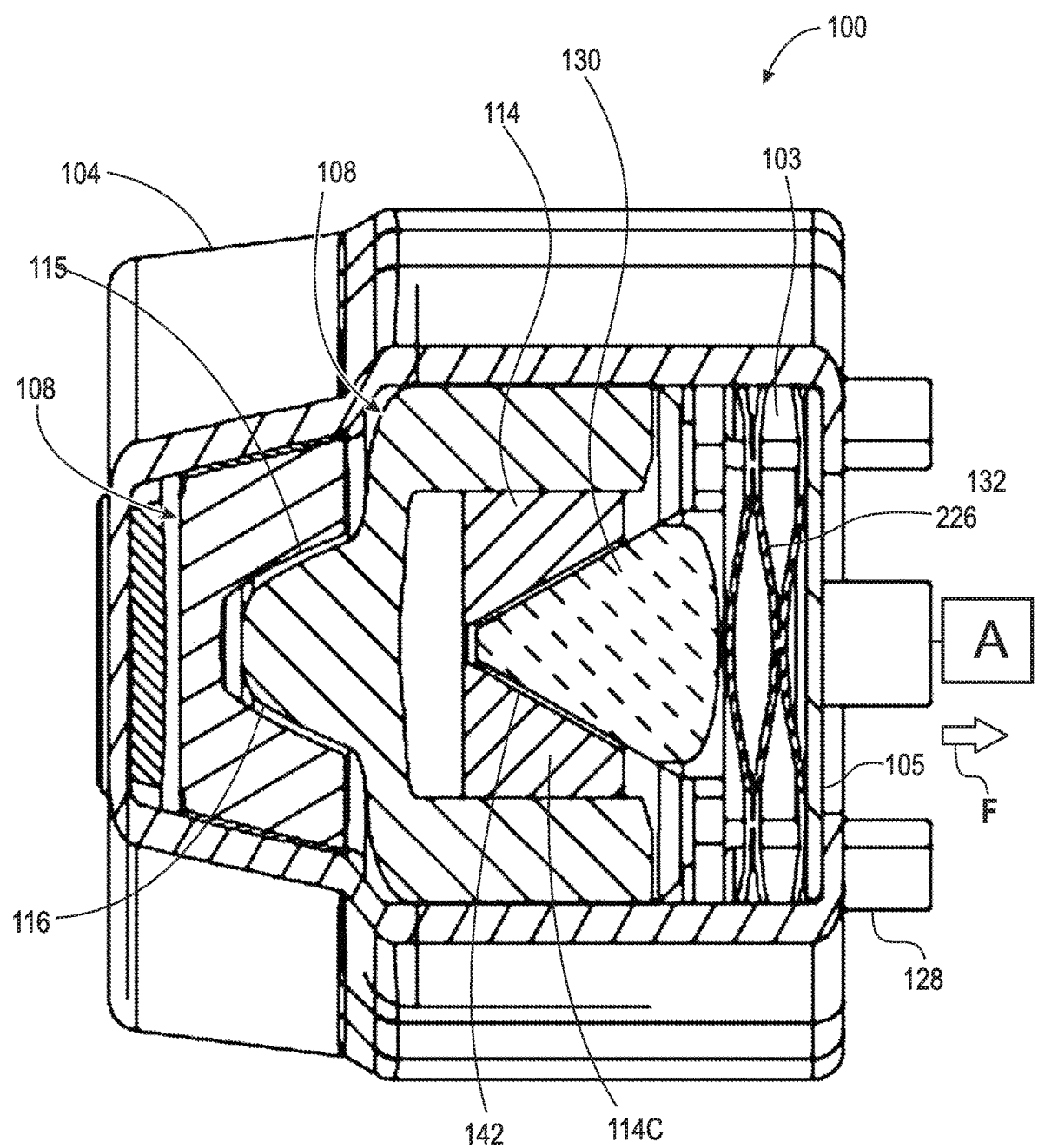
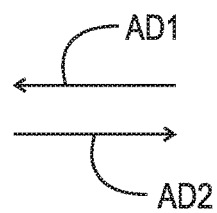
Fig. 9

SELF-CONTAINED SWITCHABLE WEDGE CLUTCH WITH TORQUE LIMITING

TECHNICAL FIELD

The present disclosure relates to a self-contained switchable wedge clutch with torque limiting.

BACKGROUND

It is desirable to have a clutch system that operates without oil lubrication from outside components, for example in a tail gate assembly. It is desirable to have a clutch system with torque limiting.

SUMMARY

According to aspects illustrated herein, there is provided a self-contained torque-limiting switchable wedge plate clutch, consisting of a housing, a space enclosed by the housing, and a clutch assembly. The clutch assembly includes: an input part arranged to receive a rotational torque and including a first frusto-conical surface; an outer race enclosed by the housing and including a second frusto-conical surface in contact with the first frusto-conical surface; an output hub at least a portion of which is located in the space and arranged to non-rotatably connect to an input shaft; a plurality of circumferentially aligned wedge plate segments an entirety of which is located in the space and radially disposed about the output hub; and an activation assembly, at least a portion of which is located in the space. The activation assembly is arranged to displace the plurality of circumferentially aligned wedge plate segments to switch the self-contained torque-limiting switchable wedge plate clutch between: a locked mode for the self-contained torque-limiting switchable wedge plate clutch, in which the input part and the output hub are non-rotatably connected and an unlocked mode for the self-contained torque-limiting switchable wedge plate clutch, in which the input part and the output hub are rotatable with respect to each other. In the locked mode: for a first magnitude of the rotational torque, the first frusto-conical surface and the second frusto-conical surface remain non-rotatably connected; and for a second magnitude of the rotational torque, greater than the first magnitude, the first frusto-conical surface rotates with respect to the second frusto-conical surface to switch the self-contained torque-limiting switchable wedge plate clutch to the unlocked mode.

According to aspects illustrated herein, there is provided a self-contained torque-limiting switchable wedge plate clutch, consisting of: an axis of rotation; a housing consisting of a sleeve including a first through-bore through which the axis of rotation passes and an end plate non-rotatably connected to the sleeve and including a second through-bore through which the axis of rotation passes; a space enclosed by the housing; and a clutch assembly. The clutch assembly includes: an input part arranged to receive rotational torque and including a first frusto-conical surface, a first portion disposed in the first through-bore, and a second portion located in the space; an outer race including a second frusto-conical surface in contact with the first frusto-conical surface; an output hub enclosed by the housing and arranged to non-rotatably connect to an input shaft passing through the second through-bore, or a portion of which extends through the second through-bore and beyond the housing in a first axial direction and arranged to non-rotatably connect to an input shaft; a plurality of circumferentially aligned wedge plate segments enclosed by the housing and radially disposed about the output hub; and an activation assembly including an activation component. The activation component: is circumferentially interleaved with the plurality of circumferentially aligned wedge plate segments; and is arranged to be axially displaced and circumferentially and radially displace the plurality of circumferentially aligned wedge plate segments to switch the self-contained torque-limiting switchable wedge plate clutch between: a locked mode for the self-contained torque-limiting switchable wedge plate clutch, in which the input part, the plurality of circumferentially aligned wedge plate segments, and the output hub are non-rotatably connected; and an unlocked mode for the self-contained torque-limiting switchable wedge plate clutch, in which the input part and the plurality of circumferentially aligned wedge plate segments are rotatable with respect to the output hub. In the locked mode: for a first magnitude of the rotational torque, the first frusto-conical surface and the second frusto-conical surface remain non-rotatably connected; and for a second magnitude of the rotational torque, greater than the first magnitude, the first frusto-conical surface rotates with respect to the second frusto-conical surface to switch the self-contained torque-limiting switchable wedge plate clutch to the unlocked mode.

According to aspects illustrated herein, there is provided a self-contained torque-limiting switchable wedge plate clutch, consisting of: a housing; and a clutch assembly. The clutch assembly includes: an input part arranged to receive a rotational torque and including a first frusto-conical surface; an outer race enclosed by the housing and including a second frusto-conical surface in contact with the first frusto-conical surface, a plurality of first ramps, and a plurality of second ramps; an output hub, at least a portion of which is located within the housing; a plurality of circumferentially aligned wedge plate segments an entirety of which is located within the housing, radially disposed about the output hub, and including a plurality of first wedge plate segments, each first wedge plate segment including a third ramp and a plurality of second wedge plate segments, each second wedge plate segment including a fourth ramp; and an activation assembly, at least a portion of which is located within the housing. The activation assembly is arranged to slide each third ramp along the respective first ramp and to slide each fourth ramp along the respective second ramp to switch the self-contained torque-limiting switchable wedge plate clutch between: a locked mode for the self-contained torque-limiting switchable wedge plate clutch, in which the input part, the plurality of circumferentially aligned wedge plate segments, and the output hub are non-rotatably connected; and an unlocked mode for the self-contained torque-limiting switchable wedge plate clutch, in which the input part and the plurality of circumferentially aligned wedge plate segments are rotatable with respect to the output hub. In the locked mode: for a first magnitude of the rotational torque, the first frusto-conical surface and the second frusto-conical surface remain non-rotatably connected; and for a second magnitude of the rotational torque, greater than the first magnitude, the first frusto-conical surface rotates with respect to the second frusto-conical surface to switch the self-contained torque-limiting switchable wedge plate clutch to the unlocked mode.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 1 is a front perspective view of a self-contained torque limited switchable wedge clutch;

FIG. 2 is a back perspective view of the self-contained torque limited switchable wedge clutch shown in FIG. 1;

FIG. 9 is cross-sectional view generally along line 9-9 in FIG. 5;

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 13:
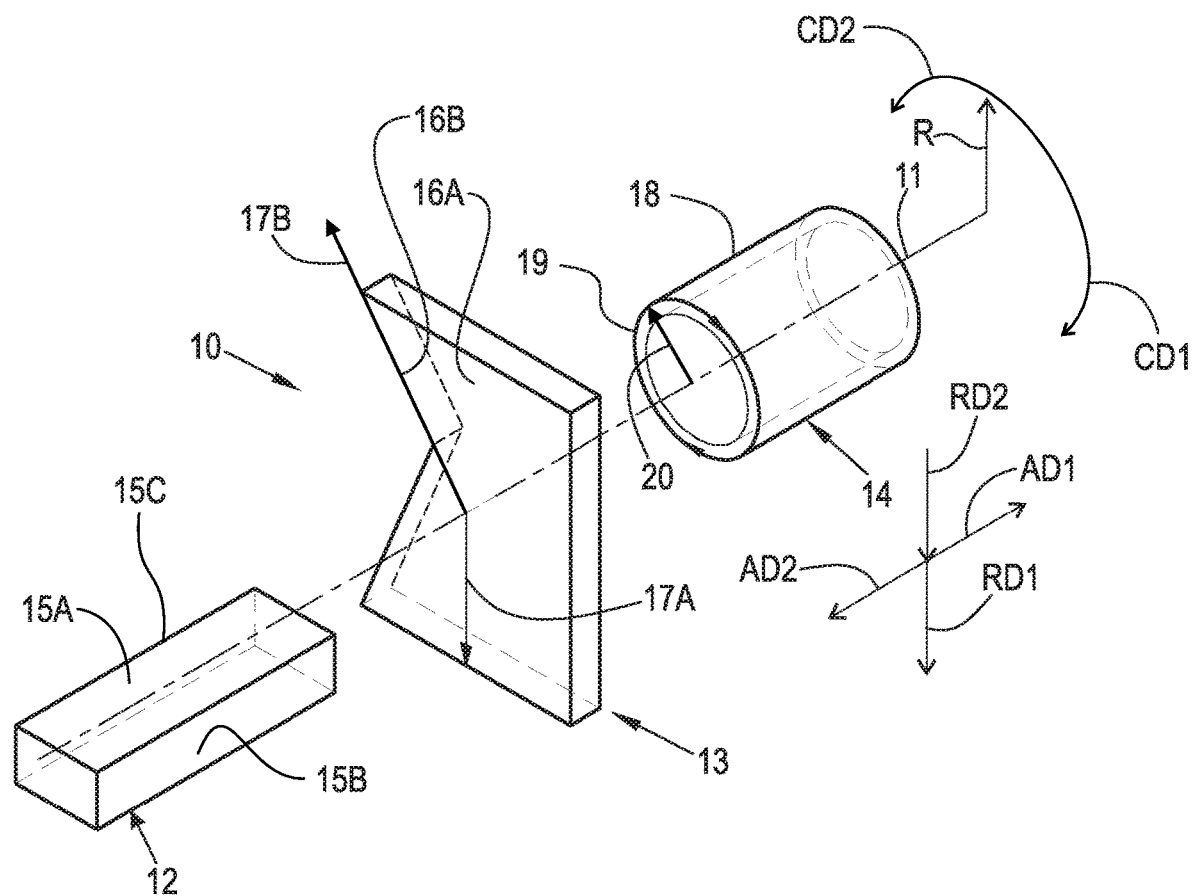
FIG. 13 is a perspective view of a cylindrical coordinate system demonstrating spatial terminology used in the present application.

FIG. 13 is a perspective view of cylindrical coordinate system 10 demonstrating spatial terminology used in the present application. The present application is at least partially described within the context of a cylindrical coordinate system. System 10 includes axis of rotation, or longitudinal axis, 11, used as the reference for the directional and spatial terms that follow. Opposite axial directions AD1 and AD2 are parallel to axis 11. Radial direction RD1 is orthogonal to axis 11 and away from axis 11. Radial direction RD2 is orthogonal to axis 11 and toward axis 11. Opposite circumferential directions CD1 and CD2 are defined by an endpoint of a particular radius R (orthogonal to axis 11) rotated about axis 11, for example clockwise and counterclockwise, respectively.

To clarify the spatial terminology, objects 12, 13, and 14 are used. As an example, an axial surface, such as surface 15A of object 12, is formed by a plane co-planar with axis 11. However, any planar surface parallel to axis 11 is an axial surface. For example, surface 15B, parallel to axis 11 also is an axial surface. An axial edge is formed by an edge, such as edge 15C, parallel to axis 11. A radial surface, such as surface 16A of object 13, is formed by a plane orthogonal to axis 11 and co-planar with a radius, for example, radius 17A. A radial edge is co-linear with a radius of axis 11. For example, edge 16B is co-linear with radius 17B. Surface 18 of object 14 forms a circumferential, or cylindrical, surface. For example, circumference 19, defined by radius 20, passes through surface 18.

Axial movement is in axial direction AD1 or AD2. Radial movement is in radial direction RD1 or RD2. Circumferential, or rotational, movement is in circumferential direction CD1 or CD2. The adverbs "axially," "radially," and "circumferentially" refer to movement or orientation parallel to axis 11, orthogonal to axis 11, and about axis 11, respectively. For example, an axially disposed surface or edge extends in direction AD1, a radially disposed surface or edge extends in direction RD1, and a circumferentially disposed surface or edge extends in direction CD1.

FIG. 1 is a front perspective view of self-contained torque limited switchable wedge clutch 100.

FIG. 2 is a back perspective view of self-contained torque limited switchable wedge clutch 100 shown in FIG. 1.

Figure 3:
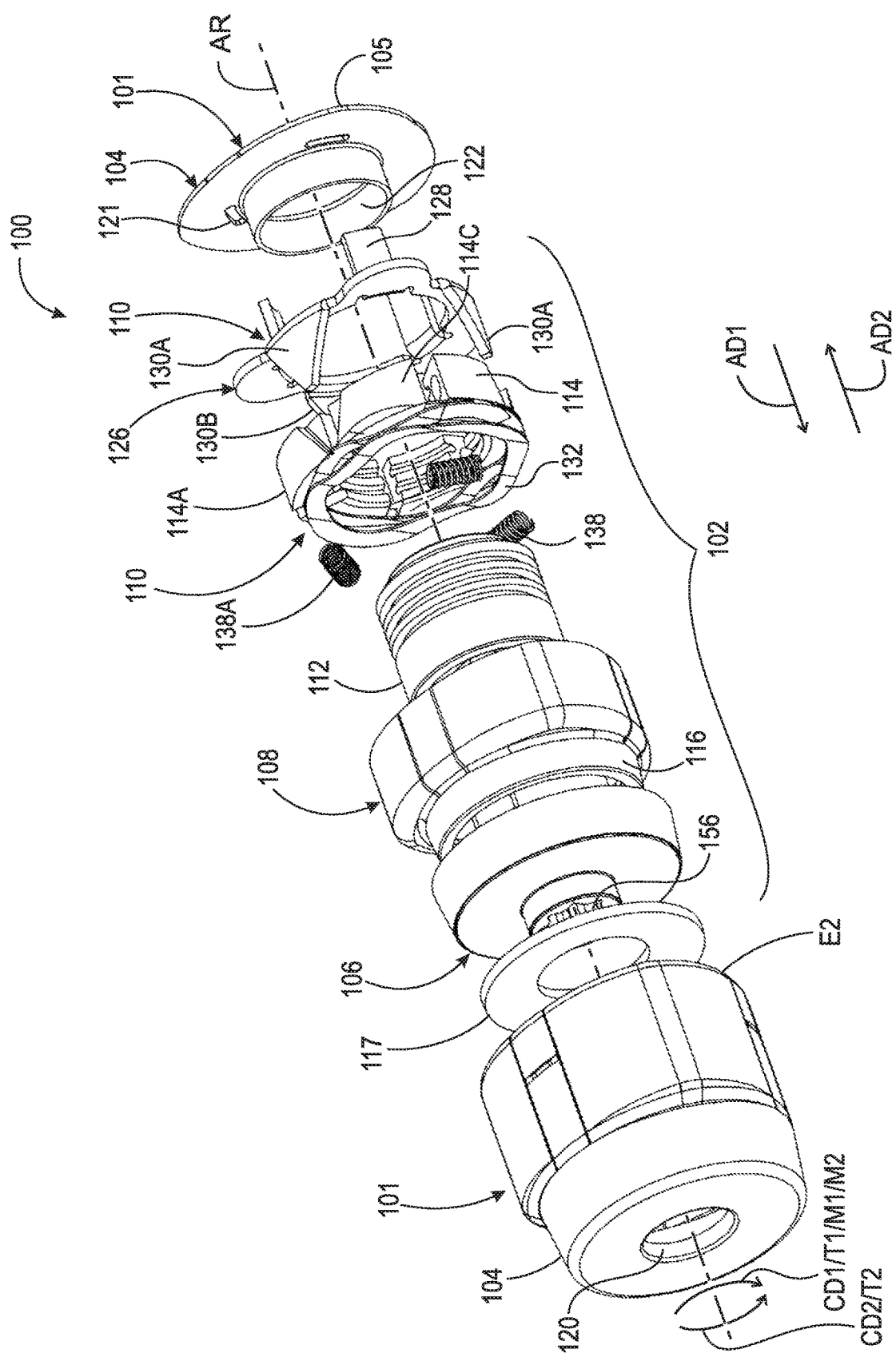
FIG. 3 is a front exploded view of the self-contained torque limited switchable wedge clutch shown in FIG. 1.

FIG. 3 is a front exploded view of self-contained torque limited switchable wedge clutch 100 shown in FIG. 1.

Figure 4:
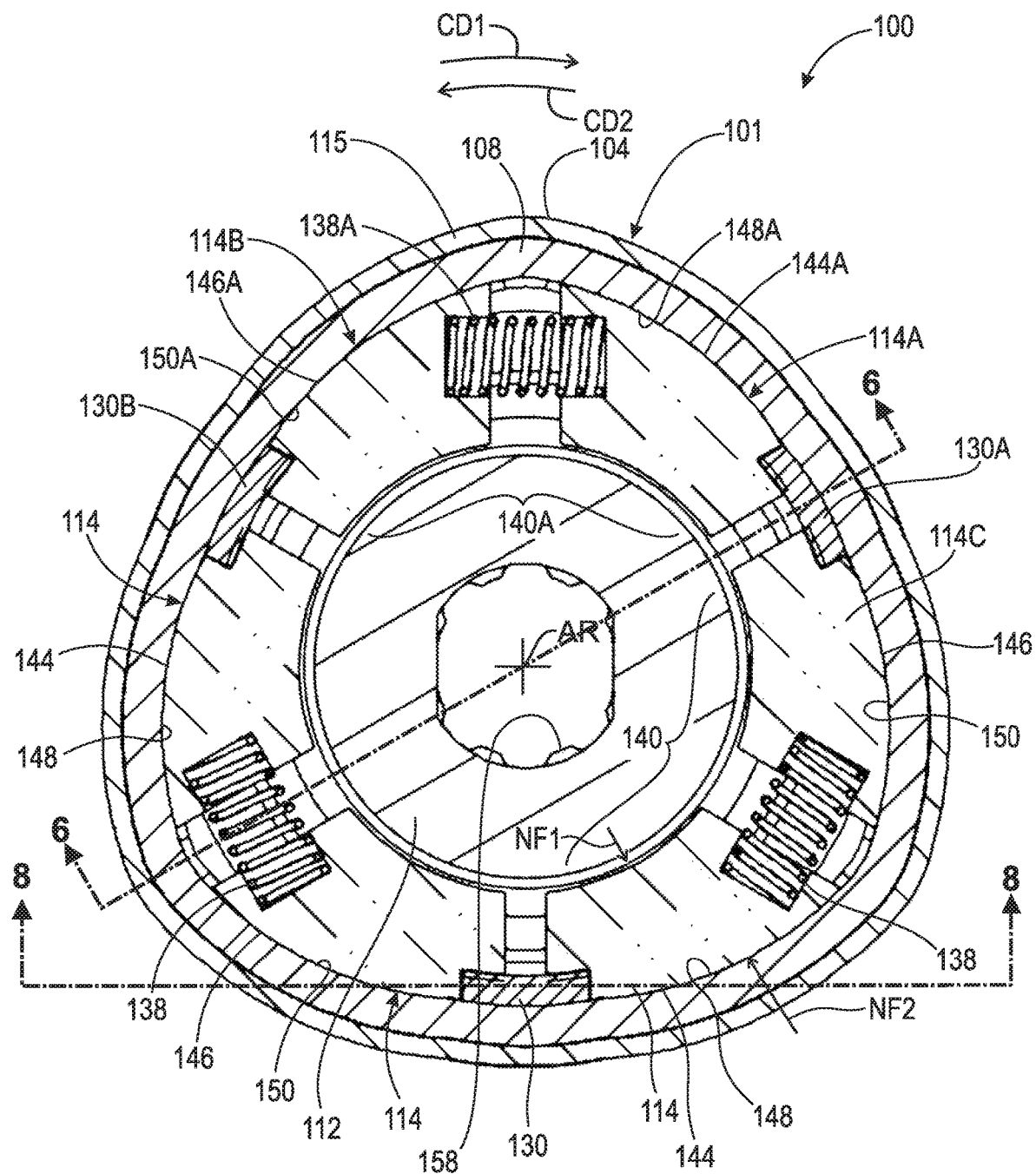
FIG. 4 is a radial cross-sectional view of the self-contained torque limited switchable wedge clutch shown in FIG. 1 in an unlocked mode.

FIG. 4 is a radial cross-sectional view of self-contained torque limited switchable wedge clutch 100 shown in FIG. 1 in an unlocked mode.

Figure 5:
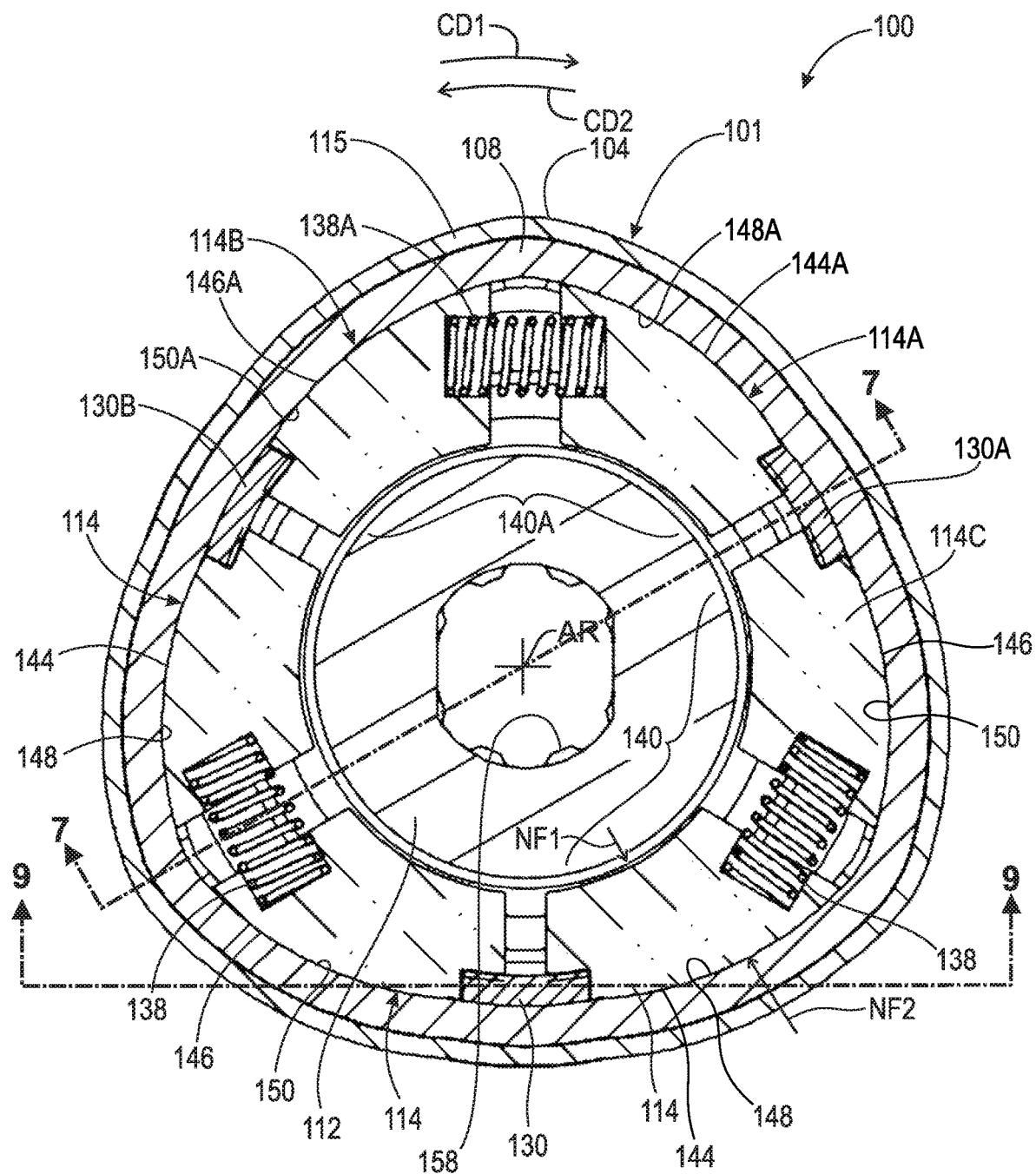
FIG. 5 is a radial cross-sectional view of the self-contained torque limited switchable wedge clutch shown in FIG. 1 in a locked mode.

FIG. 5 is a radial cross-sectional view of self-contained torque limited switchable wedge clutch 100 shown in FIG. 1 in a locked mode. The following should be viewed in light of FIGS. 1 through 5. It should understood that the difference between the circumferential positions of elements in FIGS. 4 and 5 is relatively small and may not be readily apparent in FIGS. 4 and 5. Self-contained torque limited switchable wedge clutch 100 includes: axis of rotation AR; housing 101; clutch assembly 102; and space 103 enclosed by housing 101. In an example embodiment, housing 101 includes sleeve 104 and end plate 105. Clutch assembly 102 includes: input part 106; outer race 108; activation assembly 110; output hub 112; and circumferentially aligned wedge plate segments 114. Input part 106 is arranged to receive rotational torque T1 or T2 in opposite circumferential directions CD1 and CD2, respectively.

Input part 104 is rotatable with respect to housing 101 and includes frusto-conical surface 115. In an example embodiment, an entirety of outer race 108 is located in space 103. Outer race 108 includes frusto-conical surface 116 in contact with frusto-conical surface 115. In an example embodiment, surfaces 115 and 116 slope radially inwardly in axial AD1, parallel to axis AR. By "non-rotatably connected" components, we mean that: the components are connected so that whenever one of the components rotates, all the components rotate; and relative rotation between the components is not possible. Radial and/or axial movement of non-rotatably connected components with respect to each other is possible, but not required.

Segments 114 are radially disposed about output hub 112, radially between outer race 108 and output hub 112. At least a portion of output hub 112 is located within housing 101. In an example embodiment, no portion of output hub 112 extends beyond or past housing 101 in any direction, such as axial directions AD1 or AD2 (opposite direction AD1), or outward radial direction RD1. At least a portion of segments 114 is located within housing 101. In an example embodiment, no portion of segments 114 extend beyond or past housing 101 in any direction, such as axial directions AD1 or AD2 (opposite direction AD1), or outward radial direction RD1.

In an example embodiment, output hub 112 is enclosed by housing 101. By "enclosed by housing 101," we mean the item enclosed by housing 101 is located in space 103 and does not extend beyond housing 101 in any direction. In an example embodiment, segments 114 are enclosed by housing 101. In an example embodiment, an entirety of segments 114 is located in space 103.

Figure 6:
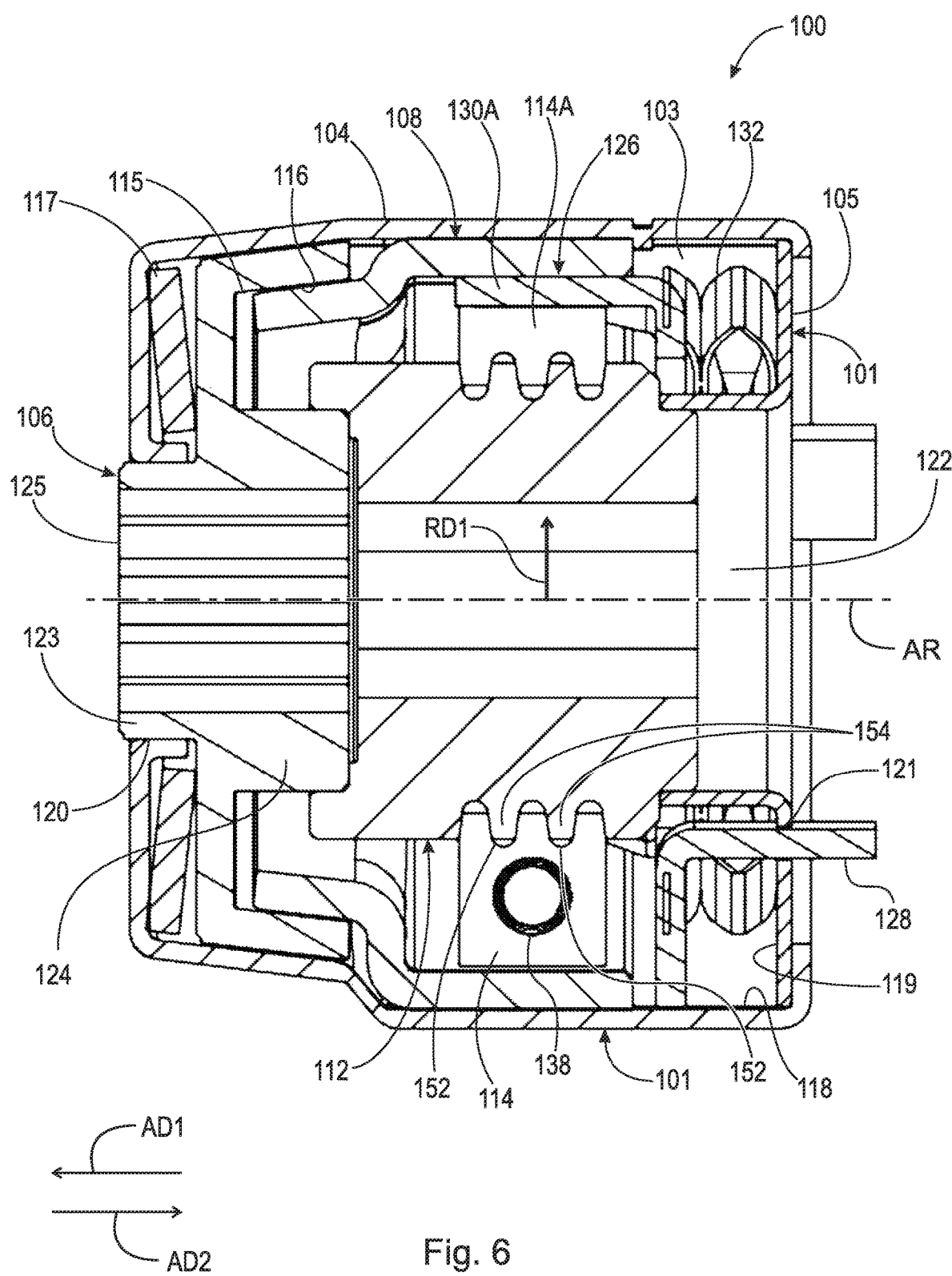
FIG. 6 is cross-sectional view generally along line 6-6 in FIG. 4.

FIG. 6 is cross-sectional view generally along line 6-6 in FIG. 4.

Figure 7:
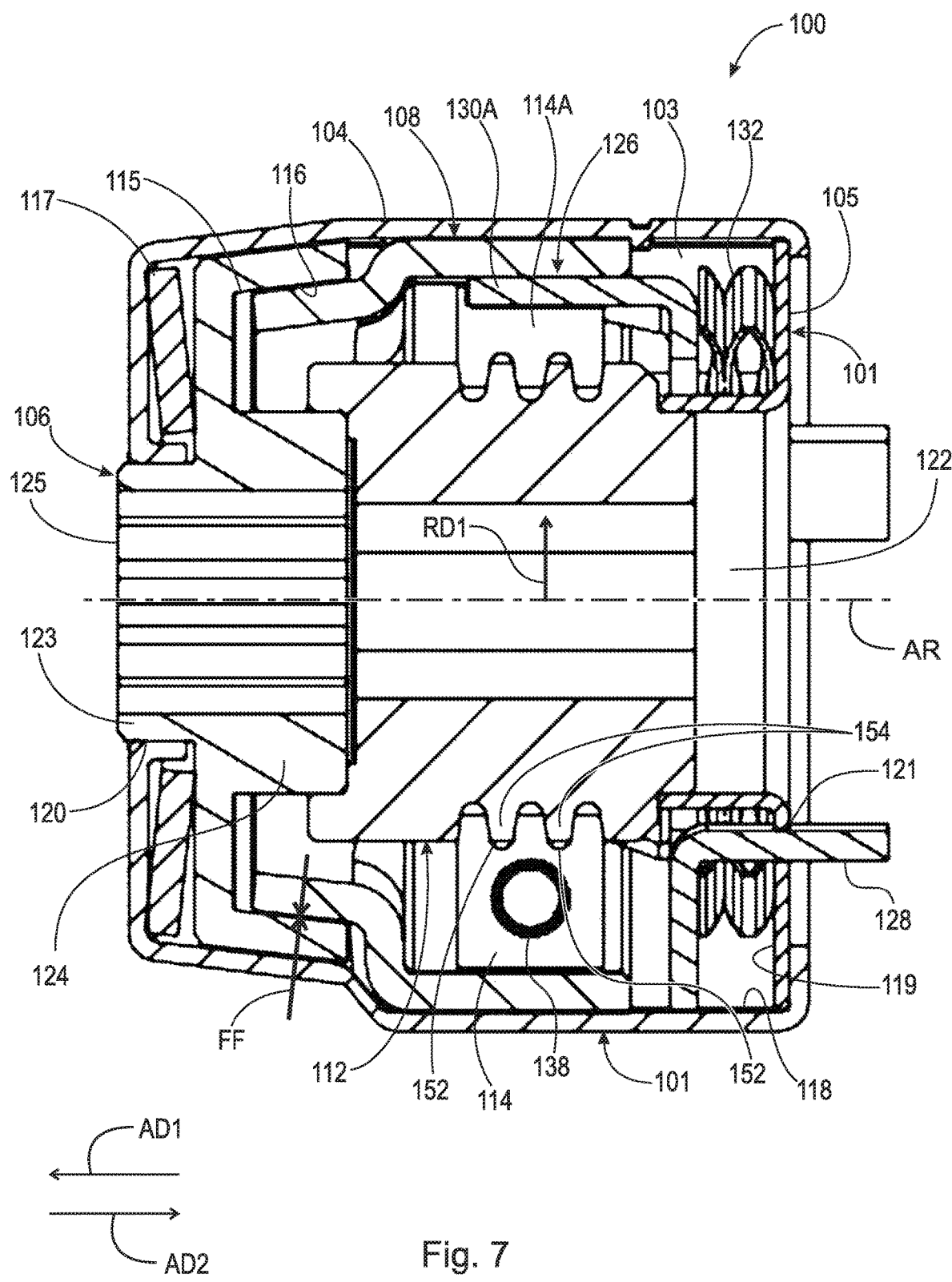
FIG. 7 is cross-sectional view generally along line 7-7 in FIG. 5.

FIG. 7 is cross-sectional view generally along line 7-7 in FIG. 5. The following should be viewed in light of FIGS. 1 through 7. As further described below, activation assembly 110 is arranged to displace circumferentially aligned wedge plate segments 114 to switch between a locked mode for self-contained torque-limiting switchable wedge plate clutch 100 and an unlocked mode for self-contained torque-limiting switchable wedge plate clutch 100. In the locked mode, input part 106 and output hub 112 are non-rotatably connected. In the unlocked mode, input part 106 and output hub 112 are rotatable with respect to each other. In an example embodiment, in the unlocked mode, circumferentially aligned wedge plate segments 114 are rotatable with respect to output hub 112 and rotate with outer race 108.

Figure 8:
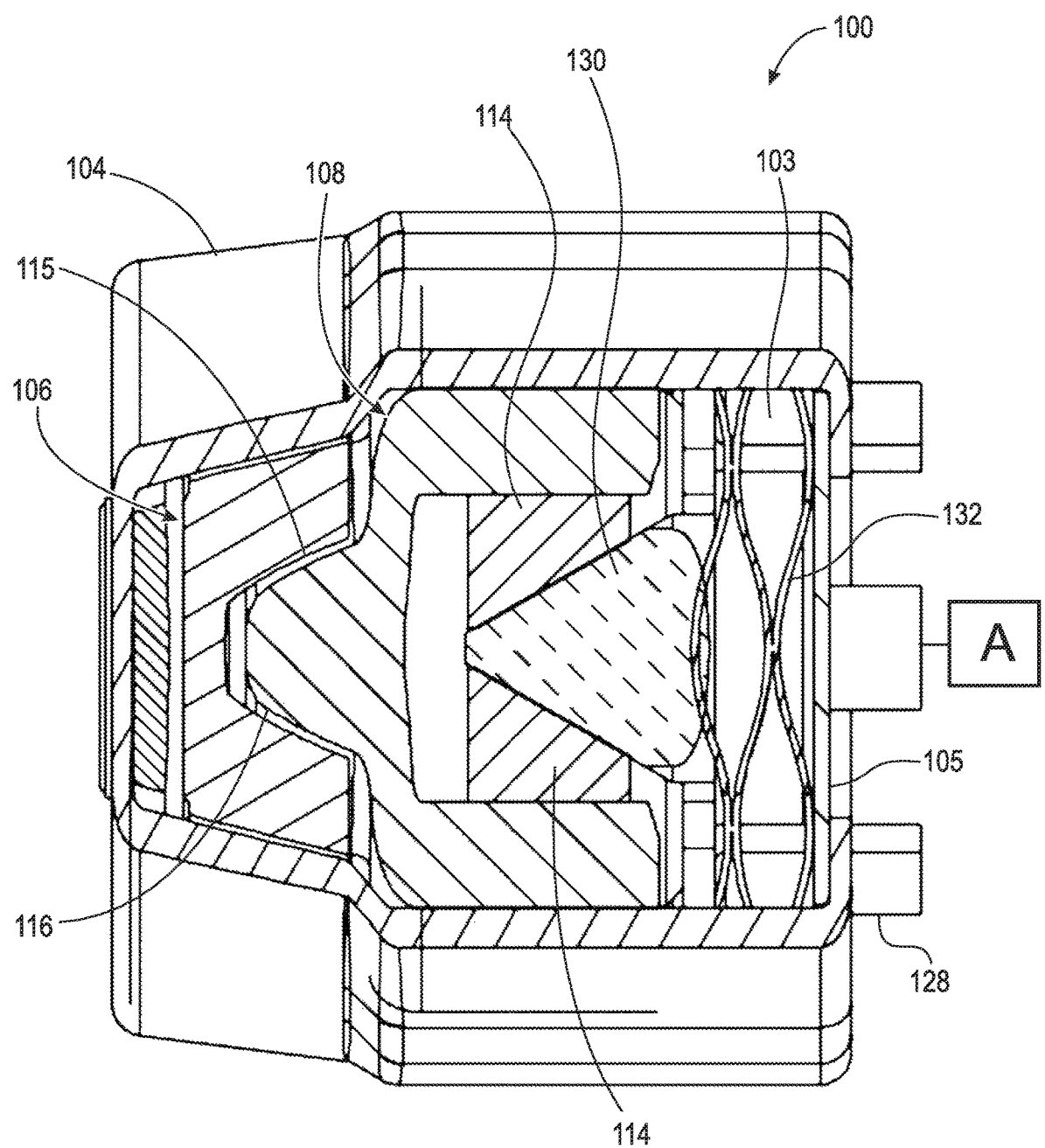
FIG. 8 is cross-sectional view generally along line 8-8 in FIG. 4.

FIG. 8 is cross-sectional view generally along line 8-8 in FIG. 4.

FIG. 9 is cross-sectional view generally along line 9-9 in FIG. 5. The following should be viewed in light of FIGS. 1 through 9. In the example of FIG. 1, clutch assembly 102 includes resilient element 117 urging input part 106 in axial direction AD2 and surface 115 into frictional contact with surface 116. In FIGS. 8 and 9, surfaces 115 and 116 are separated, for purposes of illustration, by a gap in order to more clearly distinguish surfaces 115 and 116 from each other. However, it should be understood that due to resilient element 117, surfaces 115 and 116 are actually in contact in clutch 100. The discussion that follows regarding frusto-conical surfaces 115 and 116 is directed to rotational torque T1; however, it should be understood that the discussion also is applicable to rotational torque T2.

During operation in the locked mode for self-contained torque-limiting switchable wedge plate clutch 100: for magnitude M1 of rotational torque T1, frusto-conical surface 115 and frusto-conical surface 116 remain non-rotatably connected; and for magnitude M2 of rotational torque T1, greater than magnitude M1, frusto-conical surface 115 rotates with respect to frusto-conical surface 116 to switch self-contained switchable wedge plate 100 clutch to the unlocked mode. Thus, surfaces 115 and 116 function to limit a magnitude of rotational torque T1 transmitted to the remainder of clutch assembly 102.

Due to resilient element 117, surfaces 115 and 116 are non-rotatably connected by friction force FF created by urging input part 106 and surface 115 in direction AD2 with resilient element 117. During operation of clutch 100 in the locked mode: magnitude M1 is insufficient to overcome force FF, surfaces 115 and 116 remain non-rotatably connected, and input part 106 and hub 112 remain non-rotatably connected; or magnitude M2 is sufficient to overcome force FF so that surface 115 rotates with respect to surface 116 and input part 106 rotates with respect to output hub 112.

In an example embodiment: space 103 is bounded by: inner surface 118 of sleeve 104; and inner surface 119 of end plate 105. In an example embodiment: sleeve 104 includes through-bore 120; end plate 105 includes at least one through-bore 121, and through-bore 122.

In an example embodiment: end plate 105 includes multiple through-bores 121. Neck portion 123 of input part 106 is located in bore 120 and portion 124 of input part 106 is located in space 103. Input part 106 is rotatable within through-bore 120.

Figure 10:
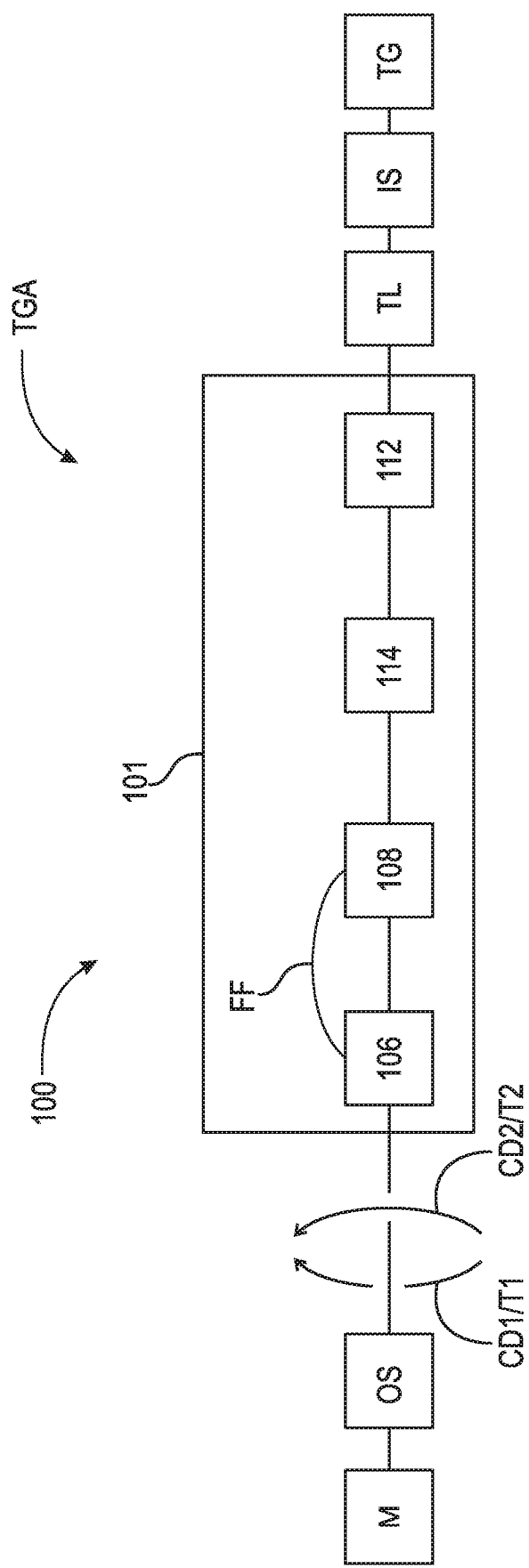
FIG. 10 is a block diagram showing an example application of the self-contained torque limited switchable wedge clutch shown in FIG. 1, in a tail gate assembly.

FIG. 10 is a block diagram showing an example application of self-contained torque limited switchable wedge clutch 100 shown in FIG. 1, in tail gate assembly TGA. The following should be viewed in light of FIGS. 1 through 10. In an example embodiment, input part 104 includes through-bore 125 arranged to receive output shaft OS. Input part 106 is arranged to non-rotatably connect to output shaft OS. Input shaft 1 is arranged to pass through through-bore 122. Output hub 112 is arranged to non-rotatably connect to input shaft IS. Axis AR passes through through-bores 120, 122, and 125.

In an example embodiment, activation assembly 110 includes activation component 126 engaged with segments 114. Component 126 includes: portion 128 extending through openings 121; and engagement elements 130. Engagement elements 130 are enclosed by housing 101. Elements 130 are circumferentially interleaved with circumferentially aligned wedge plate segments 114. Component 126 is arranged to be displaced, for example in axial directions AD1 and AD2, to switch self-contained torque-limiting switchable wedge plate clutch 100 between the locked mode and the unlocked mode. As further described below, component 126 is displaceable in axial directions AD1 and AD2 to displace circumferentially aligned wedge plate segments 114 to switch self-contained torque-limiting switchable wedge plate clutch 100 between the locked mode and the unlocked mode. In the example of FIG. 1, the only openings through housing 101 are through-bores 120, 121, and 122.

In an example embodiment, activation assembly 110 includes resilient element 132. Resilient element 132 is enclosed by housing 101. Resilient element 132 is arranged to urge component 126 in axial direction AD1.

As further described below to switch clutch 100 from the locked mode to the unlocked mode: element 132 displaces component 126 and elements 130 in axial direction AD1; elements 130 displace circumferentially aligned wedge plate segments 114 circumferentially; and elements 130 displace circumferentially aligned wedge plate segments 114 radially outwardly.

As further described below to switch clutch 100 from the unlocked mode to the locked mode: component 126, in particular portion 128, is arranged to receive force F, in axial direction AD2, from actuator A; component 126 and elements 130 displace in axial direction AD2. Actuator A can be any actuator known in the art.

In an example embodiment, activation assembly 110 is non-rotatably connected to housing 101. For example, component 126 and resilient element 132 are non-rotatably connected to housing 101. In an example embodiment, clutch 100 is a bi-directional clutch. That is, clutch 100 is operable in the locked mode for torque T1 or torque T2. For example, in the locked mode: input part 106 transmits torque T1 to output hub 112; or input part 106 transmits torque T2 to output hub 112.

In an example embodiment, clutch assembly 108 includes: resilient elements 138; and pairs 140 of segments 114. Each resilient element 138: is circumferentially disposed between the elements 114 for a respective pair 140; and urges the elements 114 for the respective pair 140 circumferentially away from each other. For example, element 138A is circumferentially disposed between segments 114A and 114B for pair 140A, and element 138A urges segment 114A in circumferential direction CD1 and segment 114B in circumferential direction CD2, opposite direction CD1. As further described below, displacing elements 114 for a respective pair 140 circumferentially away from each other transitions clutch 100 from the unlocked mode to the locked mode. In the discussion that follows, letters are used to designate a specific component from a group of components otherwise designated by a three-digit number, for example, in the discussion above, segments 114A and 114B are specific examples of segments 114.

Elements 130 extend in direction AD1. Each pair 140 is circumferentially bracketed by two respective protrusions 130. Displacing, with resilient element 132, component 126 and elements 130 in axial direction AD1 displaces segments 114 for each pair 140 circumferentially toward each other and against the urging of resilient elements 138. For example: elements 130A and 130B circumferentially bracket pair 140A; and displacing component 126 in direction AD1: causes element 130A to displace segment 114A in direction CD2 circumferentially toward segment 114B and to displace segment 114C in direction CD1; and causes element 130B to displace segment 114B in direction CD1 toward segment 114A. Segments 114A and 114B are displaced toward each other against the urging of element 138A. Displacing respective segments 114 for circumferentially adjacent pairs 140 circumferentially toward each other transitions clutch 100 from the locked mode to the unlocked mode. In an example embodiment, elements 130 are free of contact with segments 114 in the unlocked mode. For example, gap 142 is formed between elements 130 and segments 114.

In an example embodiment, to transition from the locked mode to the unlocked mode, resilient element 132 displaces component 126 in axial direction AD1 and engagement elements 130 circumferentially displace segments 114 radially outwardly to reduce, minimize, or eliminate frictional contact between output hub 112 and wedge plate segments 114.

In an example embodiment, to transition from the unlocked mode to the locked mode: actuator A is arranged to displace component 126 in axial direction AD2 to disengage engagement elements 130 from segments 114; and resilient elements 138 displace circumferentially displace segments 114 radially inwardly to initiate or increase frictional contact between output hub 112 and wedge plate segments 114. For example, displacing component 126 in direction AD2 causes elements 130A and 130B to withdraw from around pair 140A, enabling element 138A to displace segments 114A and 114B in directions CD1 and CD2, respectively.

In an example embodiment, input part 108 includes ramps 144 and 146; for each pair 140, one segment 114 includes ramp 148 and the other segment 114 includes ramp 150; hub 110 includes at least one circumferential groove 152; and each segment 114 includes at least one protrusion 154 at least partially disposed in at least one groove 152. Ramps 144 and 148 are in contact and slope radially inwardly in direction CD1. Ramps 146 and 150 are in contact and slope radially inwardly in direction CD2. For example, segment 114A includes ramp 148A in contact with ramp 144A and segment 114B includes ramp 150A in contact with ramp 146A.

The following provides further detail regarding example clutch 100 and assumes that the rotational torque transmitted to input part 106 has magnitude M1. To transition from the unlocked mode to the locked mode for relative rotation of input part 106, with respect to output hub 112, in direction CD1: actuator A displaces component 126 and elements 130 in axial direction AD2; and elements 130 are withdrawn from between pairs 140. Resilient elements 138 force the segments 114 in each pair 140 radially inwardly and circumferentially apart from each other. Thus, resilient elements 138 slide, or push: ramps 148 radially inwardly along ramps 144 in direction CD1; and ramps 150 radially inwardly along ramps 146 in direction CD2. Segments 114 with ramps 148 frictionally engage hub 112 or increase existing frictional engagement with hub 112 (via protrusions 154 in grooves 152) and rotate with hub 112, and with respect to input part 106, in direction CM. Segments 114 with ramps 150 frictionally engage hub 112 or increase existing frictional engagement with hub 112 (via protrusions 154 in grooves 152) and rotate with hub 112 and with respect to input part 106 in direction CD1.

The relative rotation in direction CD1 and frictional engagement noted above: causes ramps 148 to slide radially inwardly along ramps 144; compressively engages segments 114 with ramps 148 between hub 112 and outer race 108; and non-rotatably connects segments 114 with ramps 148 with hub 112 and input part 106. By components "compressively engaged between" two elements, we mean that: one element, for example hub 112, exerts a normal force on the component, for example, normal force NF1 on segments 114; and the other element, for example, housing 102 and outer race 108 (via ramps 144 and 146), exerts an opposite normal force on the component, for example normal force NF2 on segments 114. Thus, the two elements squeeze and lock the component between them.

The relative rotation in direction CD1 and frictional engagement note above cause ramps 150 to slide radially outwardly along ramps 146. Thus, segments 114 with ramps 150 are not compressively engaged between hub 112 and outer race 108 and are not non-rotatably connected with hub 112 and input part 106. Once in the locked mode, input part 106, hub 112, and segments 114 with ramps 148 rotate together in direction CD1. As long as component 126 remains displaced in direction AD2 and elements 130 remain out of contact with segments 114, clutch 100 remains in the locked mode regardless of the direction of torque applied to clutch 100 or a direction of rotation of hub 112 and input part 106. For example, if the torque changes to T2 in direction CD2, compressive engagement of outer race 108, hub 112, and segments 114 shifts to segments 114 with ramps 150 generally as described below for the transition from the unlocked mode to the locked mode for relative rotation of input part 106, with respect to output hub 112, in direction CD2.

To transition from the locked mode involving segments 114 with ramps 148, to the unlocked mode: actuator A is de-activated; resilient element 132 displaces component 126 in direction AD1; and elements 130 push segments 114 with ramps 148 radially outwardly away from hub 112 to reduce or eliminate frictional contact between hub 112 and segments 114 with ramps 148.

To transition from the unlocked mode to the locked mode for relative rotation of input part 106, with respect to output hub 112, in direction CD2: actuator A displaces component 126 and elements 130 in axial direction AD2; and elements 130 are withdrawn from between pairs 140. Resilient elements 138 force the segments 114 in each pair 140 radially inwardly and circumferentially apart from each other. Thus, resilient elements 138 slide, or push: ramps 150 radially inwardly along ramps 146 in direction CD2; and ramps 148 radially inwardly along ramps 144 in direction CD1. Segments 114 with ramps 150 frictionally engage hub 112 or increase existing frictional engagement with hub 112 (via protrusions 154 in grooves 152) and rotate with hub 112 and with respect to input part 106 in direction CD2. Segments 114 with ramps 148 frictionally engage hub 112 or increase existing frictional engagement with hub 112 (via protrusions 154 in grooves 152) and rotate with hub 112 and with respect to input part 106 in direction CD2.

The relative rotation in direction CD2 and frictional engagement noted above: causes ramps 150 to slide radially inwardly along ramps 146; compressively engages segments 114 with ramps 150 between hub 112 and outer race 108; and non-rotatably connects segments 114 with ramps 150 with hub 112 and input part 106.

The relative rotation in direction CD2 and frictional engagement note above causes ramps 148 to slide radially outwardly along ramps 144. Thus, segments 114 with ramps 148 are not compressively engaged between hub 112 and outer race 108 and are not non-rotatably connected with hub 112 and input part 106. Once in the locked mode, input part 106, hub 112, and segments 114 with ramps 150 rotate together in direction CD2. As long as component 126 remains displaced in direction AD2 and elements 130 remain out of contact with segments 114, clutch 100 remains in the locked mode regardless of the direction of torque applied to clutch 100 or a direction of rotation of hub 112 and input part 106. For example, if the torque changes to T1 in direction CD1, compressive engagement of outer race 108, hub 112, and segments 114 shifts to segments 114 with ramps 148 generally as described above for the transition from the unlocked mode to the locked mode for relative rotation of input part 106, with respect to output hub 112, in direction CD1.

To transition from the locked mode involving segments 114 with ramps 150, to the unlocked mode: actuator A is de-activated; resilient element 132 displaces component 126 in direction AD1; and elements 130 push segments 114 with ramps 150 radially outwardly away from hub 112 to reduce or eliminate frictional contact between hub 112 and segments 114 with ramps 150.

The following provides further detail regarding the torque-limiting operation of clutch 100. FIG. 10 illustrates an example application of clutch 100. In the example of FIG. 10: input part 106 includes splines 156; and output hub 112 includes splines 158. Assembly TGA includes motor M with output shaft IS non-rotatably connected to input part 106 via splines 156. Motor M provides rotational torque T1 and T2 to input part 106 in directions CD1 and CD2, respectively. Assembly TGA includes tail gate TG with input shaft IS non-rotatably connected to output hub 112 via splines 158. Tail gate TG impresses torque load TL on output hub 112. TL resists rotation of output hub 112 by motor M and input part 106. In the example of FIG. 10, motor M: provides rotational torque T1 to close tail gate TG; and provides rotational torque T2 to open tail gate TG.

Surfaces 115 and 116 non-rotatably connect input part 106 and outer race 108 with friction force FF. For the locked mode, for magnitude M1 of torque T1, input part 106 and outer race 108 are non-rotatably connected, and torque T1 is transmitted to hub 112. For magnitude M2 of torque T1, input part 106 rotates with respect to outer race 109 in direction CD1. Therefore, input part 106 rotates with respect to hub 112 in direction CD1 and torque T1 is not transmitted to hub 112.

In an example embodiment, every element of clutch assembly 108: transmits torque T1 or T2 in the locked configuration; is arranged to displace segments 114; or urges surfaces 115 and 116 into contact. Thus, assembly 102 consists of: input part 106; resilient element 117; outer race 108; segments 114; resilient elements 138; component 126; output hub 112; and resilient element 132.

Figure 11:
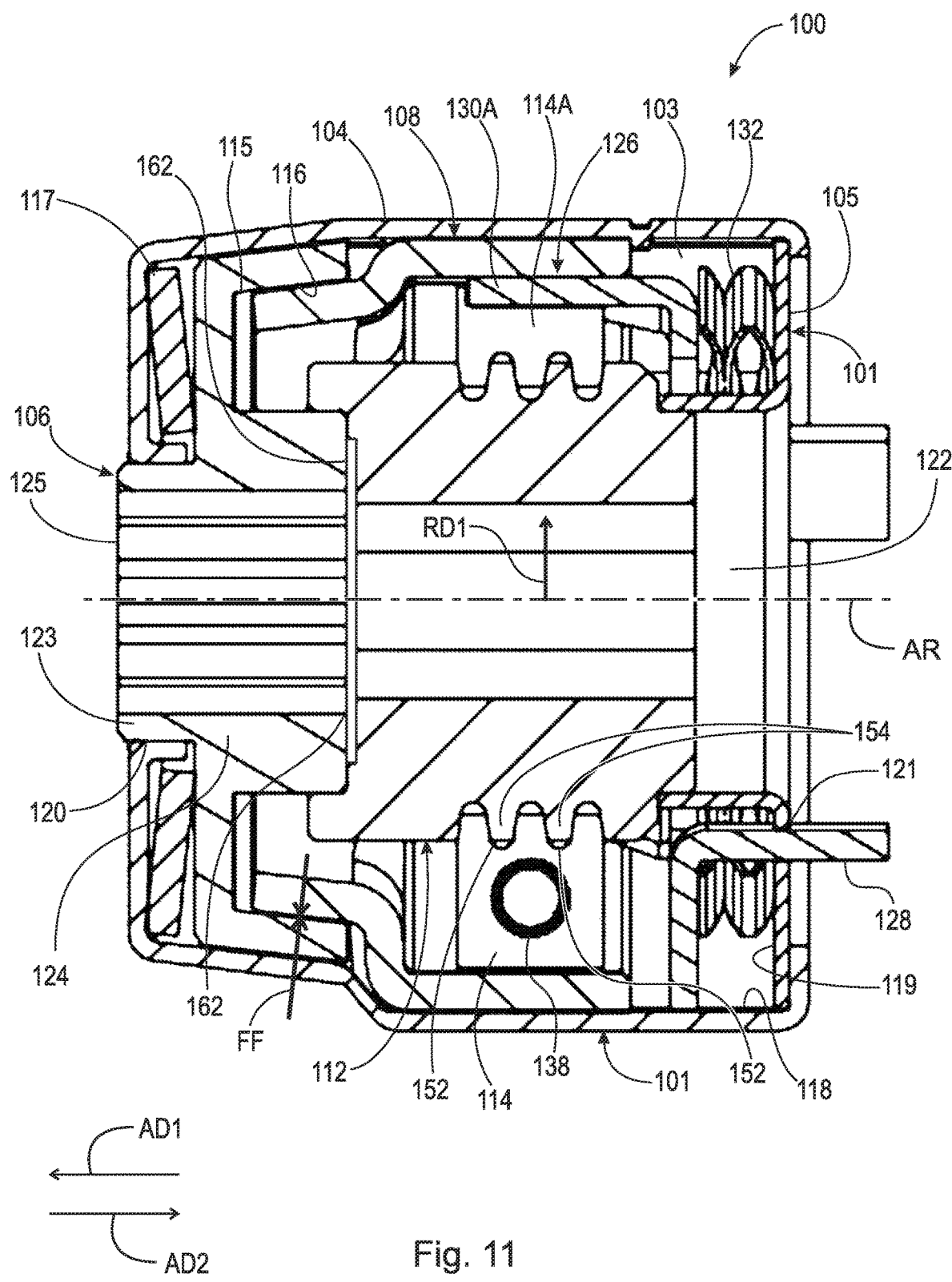
FIG. 11 is variation of the configuration shown in FIG. 4.

FIG. 11 is variation of the configuration shown in FIG. 4. In FIG. 11, plate 160 blocks axial end 162 of through-bore 125.

Figure 12:
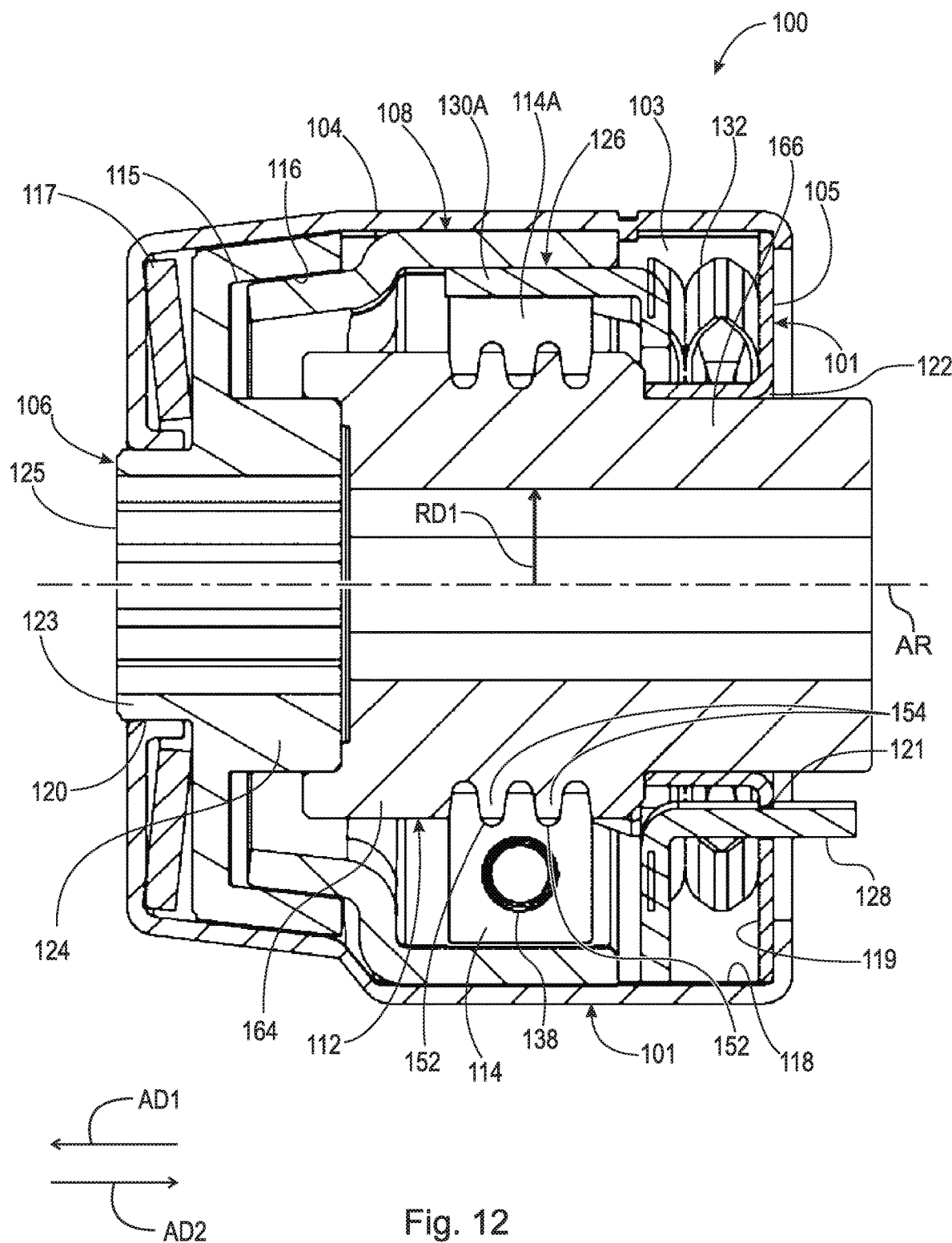
FIG. 12 is variation of the configuration shown in FIG. 4.

FIG. 12 is variation of the configuration shown in FIG. 5. In FIG. 12, portion 164 of output hub 112 is disposed within housing 101 (in space 103), and portion 166 of output hub 112 is disposed within through-bore 122. In the example of FIG. 12, portion 166 extends past housing 101 in direction AD2.

Clutch 100 prevents damage to clutch 100 and also protects the safety of personnel operating or in the vicinity of TGA, by limiting the magnitude of the rotational torque transmitted by clutch assembly 102. For example, in the locked mode, an object blocking the closing or opening movement of tailgate TG, and hence rotation of hub 112, could cause torque TL to increase such that rotational torque T1 or T2 needed to overcome torque TL would reach dangerous levels capable of damaging components of clutch 100 or the object blocking the closing or opening movement of tailgate TG. This problem is particularly serious if the object is a person. To address the preceding concerns, when rotation of hub 112 is blocked, surface 115 of input part 106 slips with respect to surface 116 of output hub 112 and clutch 100 opens. That is, torque T1 or T2 is not transmitted to hub 112.

Magnitude M2 is selectable as needed for a particular application of clutch 100. For example, the spring rate of resilient element 117 can be selected; and/or the parameters of surfaces 115 and 116, such as coefficients of friction and/or the surface area of surfaces 115 and 116 in contact, can be selected.

It should be understood that clutch 100 is not limited to the configuration shown in FIGS. 1 through 12. Further, any combination of the respective structures shown in FIGS. 1 through 12 is possible. For example: different numbers of segments 114 can be used; a different radial cross-sectional shape for housing 101 can be used; the position and functions of elements 130 and resilient elements 138 can be reversed; the directions of force for spring 132 and actuator A can be reversed; and ramps can be located on hub 112 and the radially inner surfaces of segments 114 with resilient elements 138 or elements 130 displacing segments 114 radially outwardly.

Clutch 100 is self-contained and can be installed as a complete, stand-alone component in a larger system, for example, in a tail gate assembly. For example, every component of clutch assembly 102 is partially or wholly contained within space 103 of housing 101. There is no need to add any further components to complete clutch 100. Thus, once connection to actuator A is made: input part 106 is ready to receive input torque, for example from output shaft OS; and output hub 112 is ready to transmit torque, for example to input shaft IS.

Further, being self-contained, clutch 100: can include and retain any lubrication needed, independent of the larger assembly into which clutch 100 is installed; and can be isolated from undesirable elements of the larger assembly into which clutch 100 is installed. In an example embodiments (not shown): clutch 100 includes seals around through-bores 121 to more complete isolate space 106.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS 10 cylindrical system
11 axis of rotation
AD1 axial direction
AD2 axial direction
RD1 radial direction
RD2 radial direction
CD1 circumferential direction
CD2 circumferential direction
R radius
12 object
13 object
14 object
15A surface
15B surface
15C edge
16A surface
16B edge
17A radius
17B radius
18 surface
19 circumference
20 radius
A actuator
AR axis of rotation
F force
IS input shaft
FF friction force
M1 magnitude, rotational torque
M2 magnitude, rotational torque
NF1 normal force
NF2 normal force
OS output shaft
T1 rotational torque
T2 rotational torque
100 self-contained switchable torque limited wedge clutch
101 housing
102 clutch assembly
103 space in housing
104 sleeve
105 end plate
106 input part
108 outer race
110 activation assembly
112 output hub
114 circumferentially aligned wedge plate segments
114A circumferentially aligned wedge plate segments
114B circumferentially aligned wedge plate segments
115 frusto-conical surface, input part
116 frusto-conical surface, outer race
117 resilient element
118 inner surface, sleeve
119 inner surface, end plate
120 through-bore
121 through-bore
122 through-bore
123 neck portion, input part
124 portion, input part
125 through-bore, input part
126 component, activation assembly
128 portion, component
130 engagement elements, portion 126
130A engagement element, portion 126
130B engagement element, portion 126
132 resilient element, activation assembly
138 resilient element, clutch assembly
138A resilient element, clutch assembly
140 pair of segments 114
140A pair of segments 114
142 gap
144 ramp, outer race
144A ramp, outer race
146 ramp, outer race
146A ramp, outer race
148 ramp, segment 114
148A ramp, segment 114
150 ramp, segment 114
150A ramp, segment 114
152 groove
154 protrusion
156 spline, input part
158 spline, output hub
160 plate
162 axial end, through-bore 125
164 portion, output hub
166 portion, output hub

The invention claimed is:

1. A self-contained torque-limiting switchable wedge plate clutch, consisting of:
   a housing;
   a space enclosed by the housing; and,
   a clutch assembly including:
      an input part:
         arranged to receive a rotational torque; and,
         including a first frusto-conical surface;
      an outer race:
         an entirety of which is located in the space; and,
         including a second frusto-conical surface in contact with the first frusto-conical surface;
      an output hub:
         at least a portion of which is located in the space; and,
         arranged to non-rotatably connect to an input shaft;
      a plurality of circumferentially aligned wedge plate segments:
         enclosed by the housing; and,
         radially disposed about the output hub; and,
      an activation assembly, at least a portion of which is located in the space, wherein:
   the activation assembly is arranged to displace the plurality of circumferentially aligned wedge plate segments to switch the self-contained torque-limiting switchable wedge plate clutch between:
      a locked mode for the self-contained torque-limiting switchable wedge plate clutch, in which the input part and the output hub are non-rotatably connected; and, an unlocked mode for the self-contained torque-limiting switchable wedge plate clutch, in which the input part and the output hub are rotatable with respect to each other; and, in the locked mode:

for a first magnitude of the rotational torque, the first frusto-conical surface and the second frusto-conical surface remain non-rotatably connected; and, for a second magnitude of the rotational torque, greater than the first magnitude, the first frusto-conical surface rotates with respect to the second frusto-conical surface to switch the self-contained torque-limiting switchable wedge plate clutch to the unlocked mode.

2. The self-contained torque-limiting switchable wedge plate clutch of claim 1, wherein the input part is rotatable with respect to the housing.

3. The self-contained torque-limiting switchable wedge plate clutch of claim 1, wherein:

the housing includes a first through-bore and a second through-bore;

the input part:

is arranged to non-rotatably connect to an output shaft transmitting the rotational torque; and, includes:

a third through-bore arranged to receive the output shaft;

a first portion disposed in the first through-bore; and, a second portion disposed in the space; and, a portion of the output hub is located in the second through-bore.

4. The self-contained torque-limiting switchable wedge plate clutch of claim 3, wherein:

the housing consists of:

a sleeve; and, an end plate non-rotatably connected to the sleeve;

the sleeve includes the first through-bore; and, the end plate includes the second through-bore.

5. The self-contained torque-limiting switchable wedge plate clutch of claim 4, wherein the activation assembly includes:

an activation component engaged with the plurality of circumferentially aligned wedge plate segments; and, a resilient element:

an entirety of which is located within the space; and, arranged to displace the activation component in a first axial direction to switch the self-contained torque-limiting switchable wedge plate clutch between the locked mode and the unlocked mode.

6. The self-contained torque-limiting switchable wedge plate clutch of claim 5, wherein the activation component is arranged to be displaced, in a second axial direction, opposite the first axial direction, by an actuator to switch the self-contained torque-limiting switchable wedge plate clutch between the locked mode and the unlocked mode.

7. The self-contained torque-limiting switchable wedge plate clutch of claim 3, wherein the activation assembly includes an activation component circumferentially interleaved with the plurality of circumferentially aligned wedge plate segments;

the housing includes at least one fourth through-bore;

the activation component extends through the at least one fourth through-bore; and, the only openings in the housing are the first through-bore, the second through-bore, and the at least one fourth through-bore.

8. The self-contained torque-limiting switchable wedge plate clutch of claim 1, wherein:

the activation assembly includes:

an activation component with a plurality of engagement elements circumferentially interleaved with the plurality of circumferentially aligned wedge plate segments; and, a first resilient element;

an entirety of the plurality of engagement elements is disposed within the space;

the first resilient element is arranged to displace the activation component and the plurality of engagement elements in a first axial direction to circumferentially displace the plurality of circumferentially aligned wedge plate segments to switch the self-contained torque-limiting switchable wedge plate clutch from the locked mode to the unlocked mode; and, the activation component and the plurality of engagement elements are arranged to be displaced in a second axial direction, opposite the first axial direction, by an actuator to circumferentially displace the plurality of circumferentially aligned wedge plate segments to switch the self-contained torque-limiting switchable wedge plate clutch from the unlocked mode to the locked mode.

9. The self-contained torque-limiting switchable wedge plate clutch of claim 8, wherein:

the clutch assembly includes a plurality of second resilient elements;

the plurality of circumferentially aligned wedge plate segments includes a plurality of pairs of the circumferentially aligned wedge plate segments;

each pair of the circumferentially aligned wedge plate segments includes a first wedge plate segment and a second wedge plate segment; and, a respective second resilient element:

is disposed between the first wedge plate segment and the second wedge plate segment for said each pair; and, urges the first wedge plate segment and the second wedge plate segment for said each pair circumferentially away from each other.

10. The self-contained torque-limiting switchable wedge plate clutch of claim 9, wherein:

to transition from the locked mode to the unlocked mode:

the first resilient element is arranged to displace the activation component and the plurality of engagement elements in the first axial direction; and, the plurality of engagement elements is arranged to displace the first wedge plate segment and the second wedge plate segment for said each pair circumferentially toward each other and radially outwardly; and, to transition from the unlocked mode to the locked mode:

the actuator is arranged to displace the activation component and the plurality of engagement elements in the second axial direction; and, the respective second resilient element is arranged to displace the first wedge plate segment and the second wedge plate segment for said each pair circumferentially away from each other and radially inwardly.

11. The self-contained torque-limiting switchable wedge plate clutch of claim 1, wherein:

the clutch assembly includes a plurality of first ramps and a plurality of second ramps;

the plurality of circumferentially aligned wedge plate segments includes a plurality of first wedge plate segments and a plurality of second wedge plate segments;

each first wedge plate segment includes a third ramp in contact with a respective first ramp; and,
each second wedge plate segment includes a fourth ramp in contact with a respective second ramp.

12. The self-contained torque-limiting switchable wedge plate clutch of claim 11, wherein the outer race includes the plurality of first ramps and the plurality of second ramps.

13. The self-contained torque-limiting switchable wedge plate clutch of claim 11, wherein to switch between the locked mode and the unlocked mode for the self-contained torque-limiting switchable wedge plate clutch, the activation assembly is arranged to slide:
each third ramp along the respective first ramp; and,
each fourth ramp along the respective second ramp.

14. A self-contained torque-limiting switchable wedge plate clutch, consisting of:
an axis of rotation;
a housing consisting of:
a sleeve including a first through-bore through which the axis of rotation passes; and,
an end plate non-rotatably connected to the sleeve and including a second through-bore through which the axis of rotation passes;
a space enclosed by the housing; and,
a clutch assembly including:
an input part:
arranged to receive rotational torque; and,
including:
a first frusto-conical surface;
a first portion disposed in the first through-bore; and,
a second portion located in the housing;
an outer race including a second frusto-conical surface in contact with the first frusto-conical surface;
an output hub:
enclosed by the housing, and arranged to non-rotatably connect to an input shaft passing through the second through-bore; or
a portion of which extends through the second through-bore and beyond the housing in a first axial direction, and arranged to non-rotatably connect to an input shaft; and,
a plurality of circumferentially aligned wedge plate segments:
enclosed by the housing; and,
radially disposed about the output hub; and,
an activation assembly including an activation component, the activation component:
circumferentially interleaved with the plurality of circumferentially aligned wedge plate segments; and,
arranged to:
be axially displaced; and,
circumferentially and radially displace the plurality of circumferentially aligned wedge plate segments to switch the self-contained torque-limiting switchable wedge plate clutch between:
a locked mode for the self-contained torque-limiting switchable wedge plate clutch, in which the input part, the plurality of circumferentially aligned wedge plate segments, and the output hub are non-rotatably connected; and,
an unlocked mode for the self-contained torque-limiting switchable wedge plate clutch, in which the input part and the plurality of circumferentially aligned wedge plate segments are rotatable with respect to the output hub, wherein in the locked mode:
for a first magnitude of the rotational torque, the first frusto-conical surface and the second frusto-conical surface remain non-rotatably connected; and,
for a second magnitude of the rotational torque, greater than the first magnitude, the first frusto-conical surface rotates with respect to the second frusto-conical surface to switch the self-contained torque-limiting switchable wedge plate clutch to the unlocked mode.

15. The self-contained torque-limiting switchable wedge plate clutch of claim 14, wherein:
the end plate includes at least one third through-bore;
a portion of the activation assembly passes through the at least one third through-bore; and,
the only openings in the housing are the first through-bore, the second through-bore, and the at least one third through-bore.

16. The self-contained torque-limiting switchable wedge plate clutch of claim 14, wherein:
the outer race includes a plurality of first ramps and a plurality of second ramps;
the plurality of circumferentially aligned wedge plate segments includes a plurality of first wedge plate segments and a plurality of second wedge plate segments;
each first wedge plate segment includes a third ramp in contact with a respective first ramp;
each second wedge plate segment includes a fourth ramp in contact with a respective second ramp; and,
to switch between the locked mode and the unlocked mode for the self-contained torque-limiting switchable wedge plate clutch, the activation assembly is arranged to slide:
each third ramp along the respective first ramp; and,
each fourth ramp along the respective second ramp.

17. A self-contained torque-limiting switchable wedge plate clutch, consisting of:
a housing; and,
a clutch assembly including:
an input part:
arranged to receive a rotational torque; and,
including a first frusto-conical surface;
an outer race enclosed by the housing, the outer race including:
a second frusto-conical surface in contact with the first frusto-conical surface;
a plurality of first ramps; and,
a plurality of second ramps;
an output hub, at least a portion of which is located within the housing;
a plurality of circumferentially aligned wedge plate segments:
an entirety of which is located within the housing;
radially disposed about the output hub; and,
including:
a plurality of first wedge plate segments, each first wedge plate segment including a third ramp; and,
a plurality of second wedge plate segments, each second wedge plate segment including a fourth ramp; and,
an activation assembly, at least a portion of which is located within the housing, wherein:
the activation assembly is arranged to slide each third ramp along a respective first ramp and to slide each fourth ramp along a respective second ramp to switch the self-contained torque-limiting switchable wedge plate clutch between:
a locked mode for the self-contained torque-limiting switchable wedge plate clutch, in which the input part, the plurality of circumferentially aligned wedge plate segments, and the output hub are non-rotatably connected; and,
an unlocked mode for the self-contained torque-limiting switchable wedge plate clutch, in which the input part and the plurality of circumferentially aligned wedge plate segments are rotatable with respect to the output hub; and,
in the locked mode:
for a first magnitude of the rotational torque, the first frusto-conical surface and the second frusto-conical surface remain non-rotatably connected; and,
for a second magnitude of the rotational torque, greater than the first magnitude, the first frusto-conical surface rotates with respect to the second frusto-conical surface to switch the self-contained torque-limiting switchable wedge plate clutch to the unlocked mode.

18. The self-contained torque-limiting switchable wedge plate clutch of claim 17, wherein:
the housing consists of:
a sleeve; and,
an end plate non-rotatably connected to the sleeve;
the sleeve includes a first through-bore;
the end plate includes:
a second through-bore; and,
at least one third through-bore;
the input part is disposed in the first through-bore;
the activation assembly includes an activation component:
circumferentially interleaved with the plurality of circumferentially aligned wedge plate segments;
arranged to connect to an actuator; and,
passing through the at least one third through-bore; and,
the only openings in the housing are the first through-bore, the second through-bore, and the at least on third though-bore.

19. The self-contained torque-limiting switchable wedge plate clutch of claim 18, wherein:
the clutch assembly includes a plurality of resilient elements;
the plurality of circumferentially aligned wedge plate segments includes a plurality of pairs of the circumferentially aligned wedge plate segments;
each pair of the circumferentially aligned wedge plate segments includes a first wedge plate segment and a second wedge plate segment;
a respective resilient element:
is disposed between the first wedge plate segment and the second wedge plate segment for said each pair; and,
to switch from the unlocked mode to the locked mode:
the activation component is arranged to be axially displaced by the actuator; and,
the respective resilient element is arranged to displace the first wedge plate segment and the second wedge plate segment for said each pair circumferentially away from each other.

20. The self-contained torque-limiting switchable wedge plate clutch of claim 17, wherein:
the activation assembly includes:
an activation component; and,
a resilient element; and,
the resilient element is arranged to displace the activation component in an axial direction to slide said each third ramp along the respective first ramp and to slide said each fourth ramp along the respective second ramp.

* * * * *